US008145931B2

(12) United States Patent
Vojak et al.

(10) Patent No.: US 8,145,931 B2
(45) Date of Patent: Mar. 27, 2012

(54) IMAGING DEVICE WITH ADAPTIVE POWER SAVING BEHAVIOR AND METHOD FOR USE THEREON

(75) Inventors: William John Vojak, Battle Ground, WA (US); Rabindra Pathak, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 655 days.

(21) Appl. No.: 12/154,700

(22) Filed: May 27, 2008

(65) Prior Publication Data

US 2009/0300390 A1    Dec. 3, 2009

(51) Int. Cl.
G06F 1/26    (2006.01)
G06F 1/32    (2006.01)
G06F 1/00    (2006.01)

(52) U.S. Cl. .................................. 713/323; 713/320

(58) Field of Classification Search .................. 713/320, 713/323
See application file for complete search history.

(56) References Cited

U.S. PATENT DOCUMENTS

| | | | | |
|---|---|---|---|---|
| 5,504,907 A * | 4/1996 | Stewart et al. | ................ | 713/324 |
| 5,566,340 A * | 10/1996 | Stewart et al. | ................ | 713/323 |
| 5,710,929 A * | 1/1998 | Fung | ............... | 713/322 |
| 5,926,404 A * | 7/1999 | Zeller et al. | ................... | 713/321 |
| 5,954,820 A * | 9/1999 | Hetzler | ......................... | 713/323 |
| 6,584,571 B1 * | 6/2003 | Fung | ............... | 713/310 |
| 6,594,767 B1 * | 7/2003 | Wiley et al. | ................... | 713/300 |
| 6,732,124 B1 * | 5/2004 | Koseki et al. | ........................ | 1/1 |
| 6,971,036 B2 * | 11/2005 | Freed | ............................ | 713/322 |
| 7,158,245 B2 * | 1/2007 | Qiao | ............................ | 358/1.14 |
| 7,197,654 B2 * | 3/2007 | Olsen | ............................ | 713/323 |
| 7,324,468 B2 * | 1/2008 | Fischer | ......................... | 370/311 |
| 7,353,413 B2 * | 4/2008 | Dunstan | ........................ | 713/320 |
| 7,380,147 B1 * | 5/2008 | Sun | ................................ | 713/323 |
| 7,383,457 B1 * | 6/2008 | Knight | ............................ | 713/323 |
| 7,409,565 B2 * | 8/2008 | Chotoku et al. | ............... | 713/300 |
| 7,469,349 B2 * | 12/2008 | Han et al. | ...................... | 713/300 |
| 7,716,504 B2 * | 5/2010 | Nijhawan et al. | ............. | 713/320 |
| 7,787,406 B2 * | 8/2010 | Park et al. | ...................... | 370/311 |
| 7,849,339 B2 * | 12/2010 | Lee | ................................ | 713/322 |
| 7,852,501 B2 * | 12/2010 | Terada et al. | ................. | 358/1.14 |

(Continued)

FOREIGN PATENT DOCUMENTS

EP    1061727 A2 * 12/2000

(Continued)

OTHER PUBLICATIONS

Rong Zheng; Hou, J.C.; Lui Sha; , "On time-out driven power management policies in wireless networks," Global Telecommunications Conference, 2004. GLOBECOM '04. IEEE , vol. 6, pp. 4097-4103, Nov. 29-Dec. 3, 2004.*

(Continued)

Primary Examiner — Faisal M Zaman
(74) Attorney, Agent, or Firm — Scot A. Reader

(57) ABSTRACT

An imaging device with an adaptive power saving behavior conserves power by establishing reduced power mode entry and/or exit timeout values based on device usage statistics. Such an imaging device in some embodiments comprises at least one interface and a processor communicatively coupled with the interface, wherein under control of the processor the imaging device determines usage statistics for the imaging device based on jobs received on the interface and selects a power save entry timeout value for the imaging device based on the usage statistics.

18 Claims, 3 Drawing Sheets

U.S. PATENT DOCUMENTS

| | | | |
|---|---|---|---|
| 2006/0005197 A1* | 1/2006 | Saha et al. | 718/104 |
| 2006/0230144 A1* | 10/2006 | Shah | 709/225 |
| 2006/0259803 A1* | 11/2006 | Edwards et al. | 713/320 |
| 2007/0041118 A1* | 2/2007 | Takahashi | 360/53 |
| 2007/0046988 A1* | 3/2007 | Kasatani | 358/1.15 |
| 2007/0059014 A1* | 3/2007 | Oka | 399/79 |
| 2007/0223028 A1* | 9/2007 | Boyes et al. | 358/1.14 |
| 2008/0167033 A1* | 7/2008 | Beckers | 455/432.3 |
| 2008/0239367 A1* | 10/2008 | Podl | 358/1.15 |
| 2008/0279131 A1* | 11/2008 | Malladi et al. | 370/311 |
| 2009/0028084 A1* | 1/2009 | Ping | 370/311 |
| 2009/0099897 A1* | 4/2009 | Ehrman et al. | 705/9 |
| 2011/0252252 A1* | 10/2011 | Ramakrishnan et al. | 713/320 |

FOREIGN PATENT DOCUMENTS

| | | | |
|---|---|---|---|
| JP | 10207583 A | * | 8/1998 |
| JP | 2001/347728 | | 12/2001 |
| JP | 2004358859 A | * | 12/2004 |
| JP | 2006272596 | | 10/2006 |
| JP | 2006334931 | | 12/2006 |
| JP | 2011076387 A | * | 4/2011 |
| WO | WO 2007121763 A1 | * | 11/2007 |
| WO | WO 2010105117 A1 | * | 9/2010 |
| WO | WO 2010137180 A1 | * | 12/2010 |

OTHER PUBLICATIONS

Kaiqiang Wu; Yi Liu; Haiwen Zhang; Depei Qian; , "Adaptive power management with fine-grained delay constraints," Computer Science and Information Technology (ICCSIT), 2010 3rd IEEE International Conference on , vol. 2, pp. 633-637, Jul. 9-11, 2010.*

WenZhi Chen; Huan Zheng; , "Analysis of Power Saving Effect for Dynamic Power Management," Mechatronic and Embedded Systems and Applications, Proceedings of the 2nd IEEE/ASME International Conference on , pp. 1-4, Aug. 2006.*

Samadi, M.; Afzali-Kusha, A.; , "Power management with fuzzy decision support system," ASIC, 2007. ASICON '07. 7th International Conference on , pp. 74-77, Oct. 22-25, 2007.*

* cited by examiner

IMAGING DEVICE WITH ADAPTIVE POWER SAVING BEHAVIOR AND METHOD FOR USE THEREON

BACKGROUND OF THE INVENTION

The present invention relates to reducing the amount of power used by computing devices and, more particularly, to reducing the amount of power wasted by an imaging device by determining the time of entry and/or exit by the imaging device into/from a reduced power mode based on device usage statistics.

Computing devices, such as imaging devices, consume substantial power. To make these devices more power efficient, manufacturers have equipped these devices with reduced power modes, sometimes called "sleep" modes. While in a reduced power mode, the supply of power to selected components of these devices (e.g. front panel, electromechanical elements, processing elements) is cutoff or reduced.

Many imaging devices automatically enter and/or exit reduced power modes at defined times. For example, some imaging devices automatically place themselves into a reduced power mode after a period of nonuse defined by a power save entry timeout value and, if not earlier awakened by a job request, automatically awaken from the reduced power mode after a period in the reduced power mode defined by a power save exit timeout value. Power save entry and/or exit timeout values are often configured by a human administrator and can vary anywhere from a few minutes to several hours. On some of these devices, these timeout values can also be made to vary with time of day (for example, 20 minute entry timeout value from 6 a.m. to 6 p.m., five minute entry timeout value from 6 p.m. to 6 a.m.). Regardless, in the interval between last use of the device and entry into the reduced power mode, and the interval between wakeup from the reduced power mode and first use of the device, these devices still waste considerable power. The amount of wasted power can be particularly significant at night when an imaging device remains awake after completing a management job, even though there is little chance the device will receive another job before the power save entry timeout value is reached. On the other hand, premature entry into a reduced power mode can also be extremely costly due to high energy usage during power-up cycles.

A significant contributor to wasted power in imaging devices that automatically enter and exit reduced power modes at defined times is imprudent selection of power save entry and exit timeout values. A human administrator may select entry and exit timeout values for an imaging device based largely or entirely on conjecture rather than objective analysis. Moreover, a human administrator is often responsible for configuring entry and exit timeout values on dozens or hundreds of imaging devices at multiple sites. For reasons of administrative convenience, such an administrator may configure all of these devices with the same entry and exit timeout values, even though usage patterns on these devices vary widely.

SUMMARY OF THE INVENTION

The present invention, in a basic feature, provides an imaging device and a method for use thereon that conserves power by establishing reduced power mode entry and/or exit timeout values based on device usage statistics.

In one aspect of the invention, an imaging device comprises at least one interface and a processor communicatively coupled with the interface, wherein under control of the processor the imaging device determines usage statistics for the imaging device based on jobs received on the interface and selects a power save entry timeout value for the imaging device based on the usage statistics.

In some embodiments, the usage statistics are dedicated to a first repetitive time slice.

In some embodiments, the power save entry timeout value is dedicated to the first repetitive time slice.

In some embodiments, the first repetitive time slice comprises a time of day.

In some embodiments, the first repetitive time slice comprises a time of day and a day of week.

In some embodiments, the first repetitive time slice excludes business holidays.

In some embodiments, under control of the processor the imaging device determines usage statistics dedicated to a repetitive time subslice within the first repetitive time slice, wherein the first repetitive time slice is adjusted based on the usage statistics dedicated to the repetitive time subslice.

In some embodiments, under control of the processor the imaging device determines usage statistics dedicated to a second repetitive time slice, wherein the first repetitive time slice is adjusted based on the usage statistics dedicated to the second repetitive time slice.

In some embodiments, the usage statistics comprise an average number of jobs during a plurality of instances of the repetitive time slice.

In some embodiments, the usage statistics comprise an average idle time during a plurality of instances of the repetitive time slice.

In some embodiments, the jobs comprise imaging jobs.

In some embodiments, the jobs comprise management jobs.

In some embodiments, the at least one interface comprises a network interface.

In some embodiments, the at least one interface comprises a front panel of the imaging device.

In some embodiments, under control of the processor the imaging device initiates a power saving sequence based on correspondence between a power save entry timer and the power save entry timeout value.

In some embodiments, under control of the processor the imaging device further selects a power save exit timeout value for the imaging device based on the usage statistics.

In some embodiments, under control of the processor the imaging device initiates a wakeup sequence based on correspondence between a power save exit timer and the power save exit timeout value.

In some embodiments, under control of the processor the imaging device determines a plurality of sets of usage statistics for a respective plurality of repetitive time slices based on jobs received on the interface during the respective plurality of time slices and selects a plurality of power save entry timeout values for the respective plurality of time slices based on the plurality of sets of usage statistics, respectively.

In another aspect of the invention, an imaging device comprises at least one interface and a processor communicatively coupled with the interface, wherein under control of the processor the imaging device determines usage statistics for the imaging device based on jobs received on the interface and selects a power save exit timeout value for the imaging device based on the usage statistics.

In another aspect of the invention, a method for reducing the amount of power wasted by an imaging device comprises the steps of determining usage statistics for the imaging device based on jobs detected on the imaging device and selecting a power save entry timeout value for the imaging device based on the usage statistics.

In some embodiments, the method further comprises the step of selecting a power save exit timeout value for the imaging device based on the usage statistics.

In some embodiments, the determining step comprises determining a plurality of sets of usage statistics for a respective plurality of repetitive time slices based on jobs detected during the respective plurality of time slices and the selecting step comprises selecting a plurality of power save entry timeout values for the respective plurality of time slices based on the plurality of sets of usage statistics, respectively.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
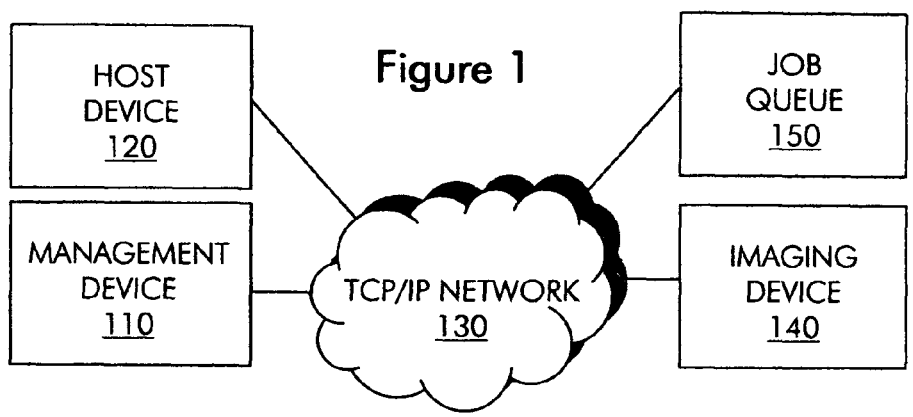
FIG. 1 shows a communication system in which the invention is operative in some embodiments.

FIG. 1 shows a communication system in which the invention is operative in some embodiments. The system includes a management device 110, a host device 120, an imaging device 140 and a job queue 150 communicatively coupled over a Transport Control Protocol over Internet Protocol (TCP/IP) network 130. Imaging device 140 processes management jobs requested by management device 110 and imaging jobs requested by host device 120. Job queue 150 queues imaging jobs submitted by host device 120 while such imaging jobs await processing on imaging device 140. TCP/IP network 130 may include any number of routers, switches and/or bridges that communicatively couple devices 110, 120, 140, 150. In some embodiments, TCP/IP network 130 traverses the public Internet.

Figure 2:
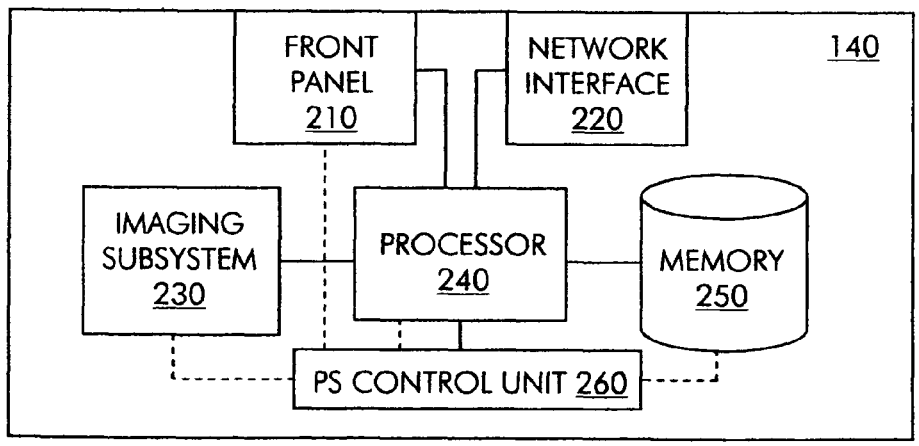
FIG. 2 shows the imaging device of FIG. 1 in more detail.

In FIG. 2, imaging device 140 is shown in more detail. Imaging device 140 is in some embodiments a multifunction printer (MFP) device that supports multiple imaging functions, such as printing, scanning and copying. Imaging device 140 has a front panel 210, which provides an interface for accepting inputs from walkup users and displaying outputs to walkup users. Front panel 210 has an input mechanism, such as buttons and/or a touch screen for accepting inputs from a user and an output mechanism, such as a liquid crystal display (LCD) or light emitting diode (LED) display for displaying outputs to a user. Imaging device 140 also has a network interface 220. Network interface 220 is a wired or wireless local area network (LAN) interface, such as an Institute of Electrical and Electronics Engineers (IEEE) 802.3- or 802.11-compliant interface, that communicatively couples imaging device 140 to TCP/IP network 130. Internal to imaging device 140, front panel 210 and network interface 220 are communicatively coupled with a processor 240, which is also coupled with a memory 250 and an imaging subsystem 230. Imaging subsystem 230 includes, for example, a scan/copy engine having scanner/copier logic, such as one or more integrated circuits (ICs), and an electromechanical section for performing a scanning and copying functions. The electromechanical section may have, for example, a line image sensor mounted on a movable carriage for optically scanning a document under the control of a scanner IC and storing the scanned document into memory 250. Imaging subsystem 230 also includes, for example, a print engine having printer logic, such as one or more ICs, and an electromechanical section for performing printing functions. The electromechanical section may have, for example, a color ink jet head mounted on a movable carriage for printing a document under the control of a printer IC. The electromechanical section may alternatively have a fusing mechanism for heating toner and fusing liquefied toner to paper. While in the illustrated embodiment an imaging device that supports scanning, copying and printing is shown, in other embodiments of the invention an imaging device that supports additional or different imaging-related functions, such as faxing and filing, or a single-function imaging device, may be employed. Memory 250 includes one or more random access memories (RAM) and one or more read only memories (ROM). Processor 240 executes software installed in memory 250 to carry-out operations on imaging device 140 including determining usage statistics for imaging device 140 based on jobs received on front panel 210 and/or network interface 220 and selecting power save entry and power save exit timeout values for imaging device 140 based on the device usage statistics. Imaging device 140 also has a power supply control unit 260 for regulating the supply of power to front panel 210, imaging subsystem 230, processor 240 and memory 250 to cause imaging device 140 to enter and exit reduced power modes.

Figure 3:
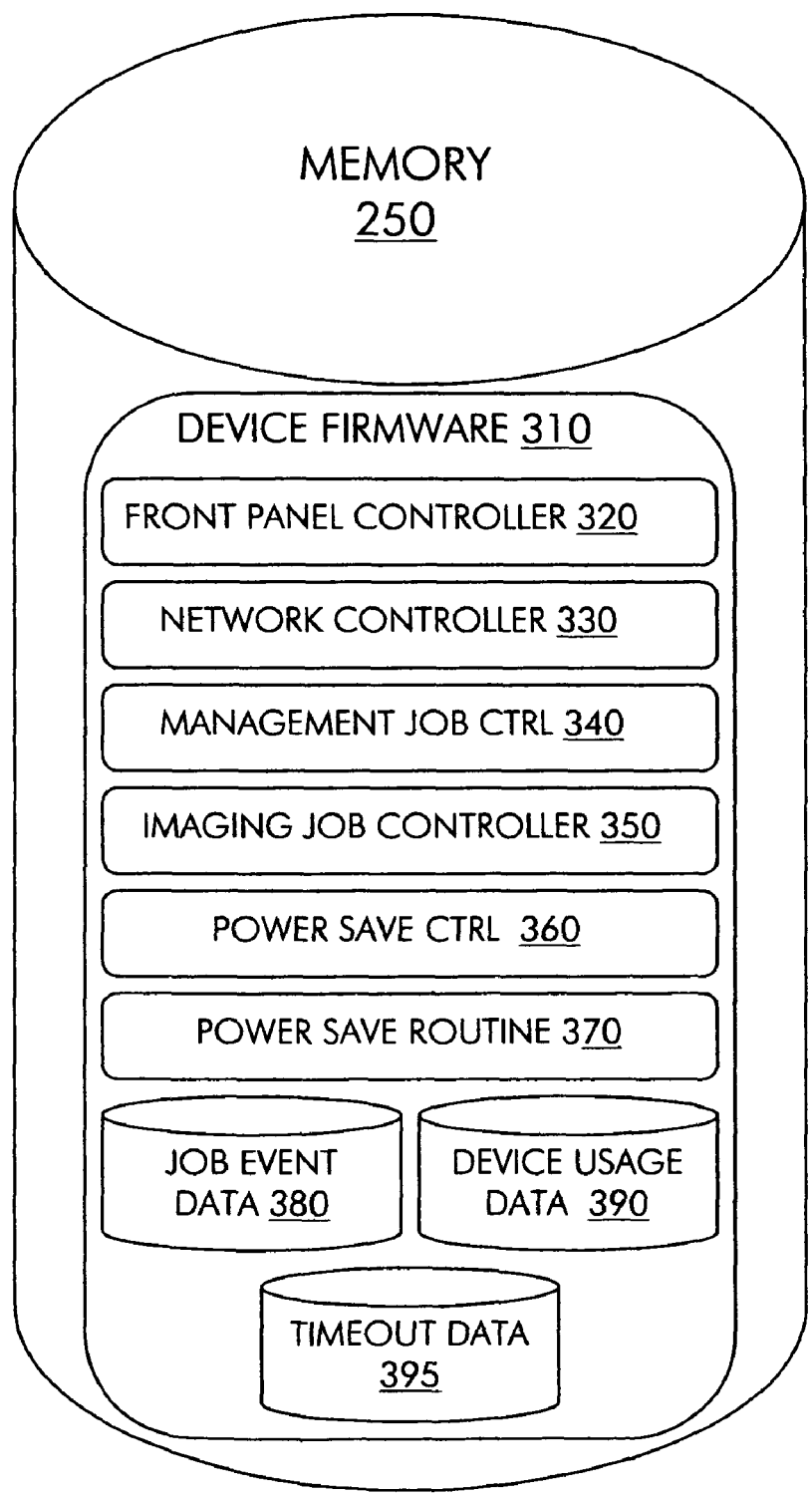
FIG. 3 shows functional elements of the imaging device of FIG. 1.

FIG. 3 shows functional elements of imaging device 140 to include device firmware 310. Firmware 310 is embedded software stored in memory 250 and executable by processor 240 to operate and manage imaging device 140.

Firmware 310 has several components. Front panel controller 320 manages interactions between imaging device 140 and walkup users via front panel 210. A walkup user may submit management and imaging jobs to imaging device 140 via inputs on front panel 210. When front panel controller 320 receives a management job, front panel controller 320 passes the management job to a management job controller 340 for processing. When front panel controller 320 receives an imaging job, front panel controller 320 passes the imaging job to an imaging job controller 350 for processing.

Network controller 330 manages interactions between imaging device 140 and network devices via network interface 220. Network controller 330 establishes and manages connectivity to TCP/IP network 130 via network interface 220. Remote users on management device 110 and host device 120 may submit management and imaging jobs to imaging device 140. Such jobs may be temporarily stored in job queue 150 and later received on network interface 220. When network controller 330 receives a management job, network controller 330 passes the management job to management controller 340 for processing. When network controller 330 receives an imaging job, network controller 330 passes the imaging job to imaging controller 350 for processing.

In some embodiments, imaging device 140 may have additional or different interfaces and counterpart controllers, such as a Small Computer System Interface (SCSI), parallel port and/or a Universal Serial Bus (USB) interface and controller, for receiving management and imaging jobs for processing by management controller 340 and imaging controller 350, respectively.

A power save controller 360 performs several functions, including: detecting job events, calculating device usage statistics based on job events, selecting power save entry and exit timeout values based on device usage statistics and prompting imaging device 140 to enter and exit a reduced power mode when power save entry and exit timers correspond with power save entry and exit timeout values, respectively.

In the job event detection role, power save controller 360 is notified by management job controller 340 of management job events and is notified by imaging job controller 350 of imaging job events. A job event notification may specify, for example, the start a job or the end of a job. A job event notification may also specify the job type (e.g. walkup management, walkup imaging, remote management, remote imaging). Power save controller 360 time stamps job events and records them in job event data 380.

In the device usage statistics calculation role, power save controller 360 calculates usage statistics for imaging device 140 for different repetitive time slices based on job event data 380. The usage statistics calculated for a repetitive time slice are dedicated to the time slice. A repetitive time slice is a particular time of day on a particular day of the week. By default, the week is segmented into 56 repetitive time slices, with each repetitive time slice representing a particular three-hour time period on a particular day of the week (e.g. 3 to 6 p.m. on Thursdays). The default time slice definition may be adjusted through execution of a management job submitted by a walkup or remote user such that repetitive time slices represent a smaller a larger time period. In any event, for each repetitive time slice that is defined, power save controller 360 calculates time slice averages based on job event data 380 for job events that occurred during the time slice. For example, power save controller 360 may calculate that the average number of jobs received between 3 and 6 p.m. on Thursdays is 21.0 and that the average idle time (i.e. time between jobs) is 6.5 minutes. Other averages may be calculated, such as the average processing time for a job. Averages may be mean or median averages, for example. Power save controller 360 may update averages for a given time slice upon commencement of an instance of the time slice to incorporate job events detected during the immediately preceding instance of the time slice. For example, averages for the Thursday 3 to 6 p.m. time slice may be updated at 3 p.m. on Thursday May 8th to incorporate job events detected between 3 and 6 p.m. on Thursday May 1st. In some embodiments, power save controller 360 is business holiday aware. In these embodiments, job event data collected during instances of the time slice falling on business days that are not workdays are excluded from time slice averages in order to avoid data skew. Power save controller 360 records time slice averages in device usage data 390.

In some embodiments, power save controller 360 dynamically adjusts the time slice definition based on job event data 380. In these embodiments, power save controller 360 calculates usage statistics for imaging device 140 that are dedicated to subslices (e.g. 15 minute increments) within the repetitive time slices that are used to determine power save entry/exit timeout values. When power save controller 360 determines that differences in job statistics (e.g. average number of jobs, idle time, etc.) between consecutive time slices is not statistically significant, power save controller 360 automatically combines the time slices into a larger time slice. Similarly, when power save controller 360 determines that differences in job statistics between two or more subslices that are part of the same time slice are statistically significant, power save controller 360 automatically divides the time slice into two or more smaller time slices. Through this process, an asymmetric but highly functional time slice definition may be realized.

In the power save entry/exit timeout value selection role, power save controller 360 selects current power save entry and exit timeout values for a time slice based on calculated device usage statistics for the time slice. Power save controller 360 may update power save entry and exit timeout values for a time slice upon commencement of the time slice. Power save controller 360 executes an algorithm to make the selection. Generally speaking, the power save entry timeout value will have a direct correlation with device usage (as measured by, for example, the average number of jobs and/or idle time between jobs) while the power save exit timeout value will have an inverse correlation with device usage. Conversely, the power save entry timeout value will have an inverse correlation device usage while the power save exit timeout value will have a direct correlation with device usage. Returning momentarily to an earlier example, in the relatively high-usage Thursday 3 to 6 p.m. time slice where the average number of jobs received is 21.0 and the average idle time is 6.5 minutes, the power save entry timeout value may be set to 19.5 minutes (3× the idle time) while the power save exit timeout value may be set to 6.5 minutes (1× the idle time) to reduce risks of premature entry into and overstay in reduced power mode. Several hours later, in the relatively low-usage Friday 3 to 6 a.m. time slice where the average number of jobs received is 0.2 and the average idle time is 163.7 minutes, the power save entry timeout value may be set to 1.0 minute while the power save exit timeout value may be set to 61.0 minutes to reduce risks of overstay in full power mode and premature exit from reduced power mode. It bears noting, however, that even in a low-usage time slice such as Friday 3 to 6 a.m., setting a power save entry timeout value that is too low runs risks of premature entry into reduced power mode since the submission of multiple jobs by the same user in close temporal proximity is fairly common. Power save controller 360 records the current power save entry and exit timeout values in timeout data 395.

In some embodiments, the algorithm executed by power save controller 360 performs a statistical analysis to determine power save entry/exit timeout values. In some of these embodiments, a normal distribution with confidence intervals is used. For example, power save controller 360 may set the power save entry timeout value to an idle time that is two standard deviations ($2\sigma$) above the mean idle time for the time slice assuming a normal distribution. Other stochastic models may be invoked. For example, a variant of queuing theory can be employed to predict the time of arrival of the next job so that the power save entry and exit timeout values can be judiciously set. Examples include a Markovian arrival process (MAP), batch Markovian arrival process (BMAP) or Memorylessness Poisson process (i.e. evolution without after-effects).

In the role of prompting imaging device 140 to enter/exit reduced power mode, power save controller 360 starts, resets and monitors power save entry and exit timers and, upon detecting a timeout, prompts power save routine 370 to enter or exit a reduced power mode. A power save entry timeout occurs when imaging device 140 is in a full power mode and the power save entry timer advances into correspondence with the currently selected power save entry timeout value. When timeout is detected, power save controller 360 commands power save routine 370 to initiate a power saving sequence in which imaging device 140 transitions to a reduced power mode. A power save exit timeout occurs when imaging device 140 is in a reduced power mode and the power save exit timer corresponds with the currently selected power save exit timeout value. When timeout is detected, power save controller 360 commands power save routine 370 to initiate a wakeup sequence in which imaging device 140 transitions to full power mode.

Power save routine 370 initiates a power saving sequence on imaging device 140 upon command of power save controller 360. The power saving sequence transitions imaging device 140 from full power mode to a reduced power mode. Under control of power save routine 370, the power saving sequence may proceed in various ways. In some embodiments, imaging device 140 blocks acceptance of jobs pending in job queue 150, aborts management jobs executing on imaging device 140, aborts imaging jobs executing on imaging device 140, and then enters the reduced power mode. In other embodiments, imaging device 140 blocks acceptance of imaging jobs pending in job queue 150, completes management jobs executing on imaging device 140, aborts imaging jobs executing on imaging device 140, and then enters the reduced power mode. In yet other embodiments, imaging device 140 blocks acceptance of imaging jobs pending in job queue 150, completes management jobs executing on imaging device 140, completes imaging jobs executing on imaging device 140, and then enters the reduced power mode. In still other embodiments, imaging device 140 completes management jobs executing on imaging device 140, completes imaging jobs executing on imaging device 140, completes imaging jobs pending in job queue 150, and then enters the reduced power mode. In embodiments where imaging device 140 blocks acceptance of imaging jobs pending in job queue 150, imaging device 140 flushes job queue 150. Moreover, in embodiments where imaging device 140 does not complete all imaging jobs executing on imaging device 140 and pending in job queue 150, imaging device 140 may notify by email or instant message users whose jobs will not be completed. Power save routine 370 issues a command to power supply control unit 260 indicating the reductions in power that are required to enter the reduced power mode, which reductions are subsequently made by power supply control unit 260.

Imaging device 140 supports multiple reduced power modes. Power save controller 360 indicates in its command to power save routine 570 which reduced power mode should be entered. In some embodiments, the reduced power modes include standby and sleep. In standby mode, power is inhibited to front panel 210 but imaging subsystem 230 and processor 240 remain powered. Standby mode saves power while enabling relatively quick return to a fully operational state. Moreover, tasks such as gathering statistics, responding to network discovery queries and reviewing imaging jobs, as well as monitoring by power save controller 360 of the power save exit timer, can be performed while imaging device 140 is in standby mode. In sleep mode, power is inhibited to front panel 210 and imaging subsystem 230 while processor 240 remains powered. Sleep mode saves additional power. Moreover, tasks like gathering statistics, responding to network discovery queries and reviewing imaging jobs, as well as monitoring by power save controller 360 of the power save exit timer, can be performed while imaging device 140 is in sleep mode. Other reduced power modes are possible, such as a hibernate mode in which device status is stored in a nonvolatile area of memory 250, after which power is inhibited to front panel 210, imaging subsystem 230 and processor 240.

Power save routine 370 initiates a wakeup sequence on imaging device 140 upon command of power save controller 360. The wakeup sequence transitions imaging device 140 from a reduced power mode into full power mode. Power save routine 370 issues a command to power supply control unit 260 to return imaging device 140 to full power mode, which is executed by power supply control unit 260.

Figure 4:
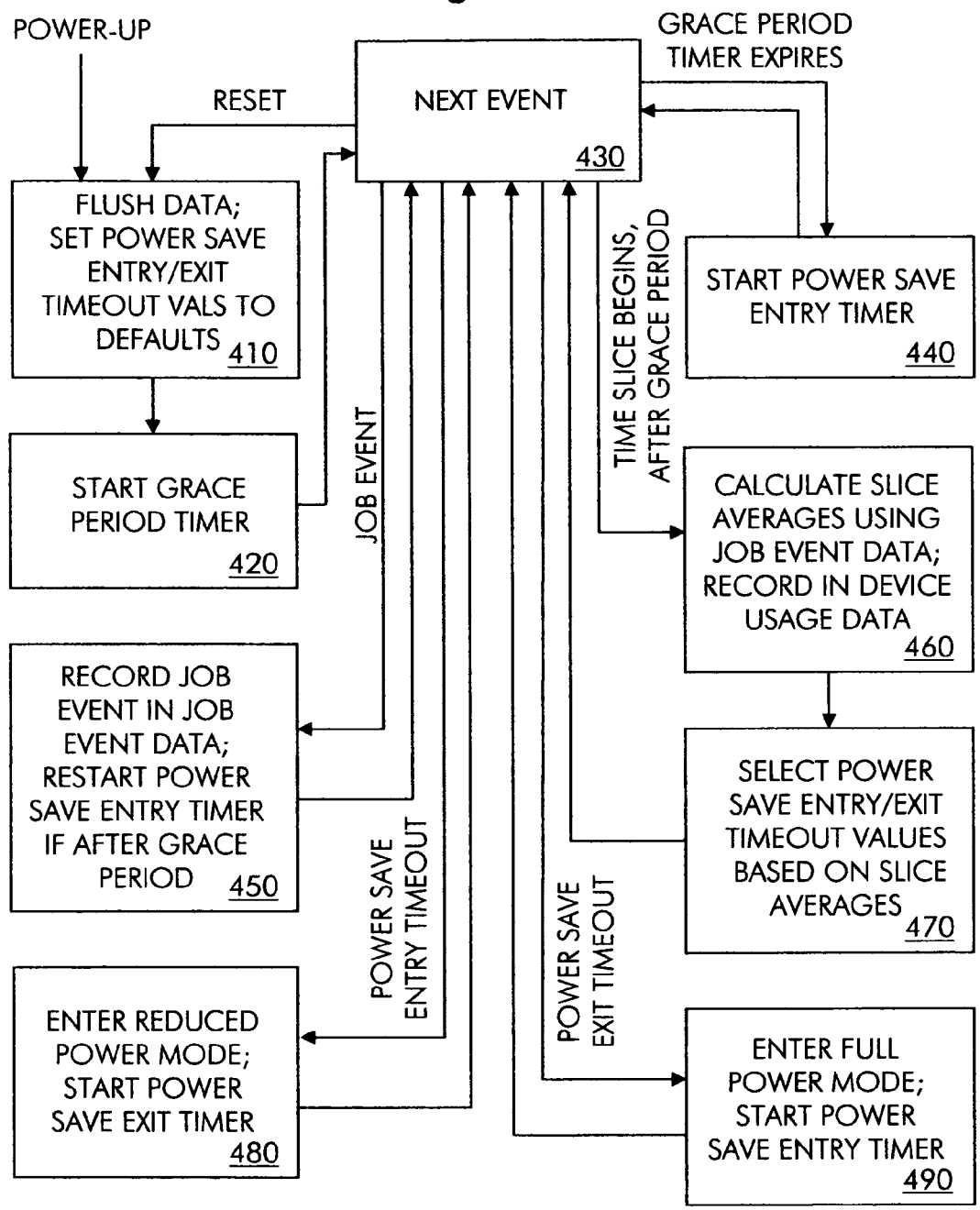
FIG. 4 shows a method performed by the imaging device of FIG. 1 in some embodiments of the invention.

FIG. 4 shows a method performed by imaging device 140 in some embodiments of the invention. Upon power-up of imaging device 140, power save controller 360 flushes job event data 380, device usage data 390 and timeout data 395, sets the power save entry timeout value and power save exit timeout value to default values in timeout data 395 (410) and starts a grace period timer (420). Until the grace period timer expires, power save controller 360 is inhibited from changing the power save entry and exit timeout values to ensure that changes are not made to these values based on a sample of jobs that is too small to be representative. The grace period may be, for example, two weeks. In other embodiments, a job threshold may be used in lieu of a grace period timer. In these embodiments, changes to the power save entry and exit timeout values are inhibited until a threshold number of jobs have been detected.

Once the grace period timer has been set, power save controller 360 awaits the next event (430). If the next event is a reset event, Steps 410 and 420 are repeated and power save controller 360 awaits the next event (430). A reset may occur if the time slice length is changed, for example, from three hours to one hour. If the next event is a job event, for example, start or completion of a management or imaging job, power save controller 360 time stamps and records the job event in job event data 380 and, if the grace period has expired, restarts the power save entry timer (450), then awaits the next event (430). If the next event is expiration of the grace period timer, power save controller 360 starts the power save entry timer (440), then awaits the next event (430). If the next event is the beginning of a new time slice and the grace period timer has expired, power save controller 360 calculates time slice averages, for example, the average number of jobs and average idle time during the time slice, using job event data 380 and records the time slice averages in device usage data 390 (460). Power save controller 360 then, if indicated by the time slice averages, selects power save entry and exit timeout values based on the slice averages (470) and awaits the next event (430). It bears noting that before the grace period timer expires, power save controller 360 does not perform Steps 460 and 470 at the beginning of time slices. If the next event is a power save entry timeout, that is, if the power save entry timer has advanced to the current power save entry timeout value, power save controller 360 issues a command to power save routine 370 to initiate a power saving sequence and transition imaging device 140 to a reduced power mode, and starts the power save exit timer (480) prior to awaiting the next event (430). Lastly, if the next event is a power save exit timeout, that is, if the power save exit timer has reached the current power save exit timeout value, power save controller 360 issues a command to power save routine 370 to initiate a wakeup sequence and transition imaging device 140 to full power mode, and starts the power save entry timer (490) prior to awaiting the next event (430).

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come with in the meaning and range of equivalents thereof are intended to be embraced therein.

What is claimed is:

1. An imaging device, comprising:
   at least one interface; and
   a processor communicatively coupled with the interface, wherein under control of the processor the imaging device compiles over multiple weeks for each of a plurality of discrete time slices each bounded by a particular start and end time on a particular day of the week usage statistics for the time slice based on jobs received on the interface during the time slice, selects a power save entry timeout value and a power save exit timeout value for each time slice based on the usage statistics compiled for the time slice, initiates a power saving sequence during each time slice based on the power save entry timeout value selected for the time slice, initiates a wakeup sequence during each time slice based on the power save exit timeout value selected for the time slice and automatically combines at least two consecutive ones of the time slices into a larger time slice in response to determining that differences in the usage statistics compiled for the consecutive time slices are statistically insignificant, whereupon the larger time slice replaces the consecutive time slices in the plurality of discrete time slices for which power save entry timeout values and power save exit timeout values are selected.

2. The imaging device of claim 1, wherein business holidays are excluded from the usage statistics.

3. The imaging device of claim 1, wherein the usage statistics comprise an average number of jobs.

4. The imaging device of claim 1, wherein the usage statistics comprise an average idle time between jobs.

5. The imaging device of claim 1, wherein the jobs comprise imaging jobs and management jobs.

6. The imaging device of claim 1, wherein the at least one interface comprises at least one of a network interface or a front panel interface.

7. An imaging device, comprising:
   at least one interface; and
   a processor communicatively coupled with the interface, wherein under control of the processor the imaging device compiles for each of a plurality of discrete time slices each bounded by a particular start and end time on a particular day of the week over multiple weeks usage statistics for the time slice based on jobs received on the interface during the time slice, selects a power save entry timeout value and a power save exit timeout value for each time slice based on the usage statistics for the time slice, initiates a power saving sequence during each time slice based on the power save entry timeout value selected for the time slice and initiates a wakeup sequence during each time slice based on the power save exit timeout value selected for the time slice, and wherein under control of the processor the imaging device further compiles for each of a plurality of discrete time subslices each occupying a particular portion of one of the time slices usage statistics for the time subslice based on jobs received on the interface during the time subslice and automatically divides the one time slice into at least two smaller time slices corresponding to the subslices in response to determining that differences in the usage statistics compiled for the subslices are statistically significant, whereupon the smaller time slices replace the one time slice in the plurality of discrete time slices for which power save entry timeout values and power save exit timeout values are selected.

8. The imaging device of claim 7, wherein business holidays are excluded from the usage statistics.

9. The imaging device of claim 7, wherein the usage statistics comprise an average number of jobs.

10. The imaging device of claim 7, wherein the usage statistics comprise an average idle time between jobs.

11. The imaging device of claim 7, wherein the jobs comprise imaging jobs and management jobs.

12. The imaging device of claim 7, wherein the at least one interface comprises at least one of a network interface or a front panel interface.

13. A method for reducing the amount of power consumed by an imaging device, comprising the steps of:
   compiling over multiple weeks, by the imaging device, for each of a plurality of discrete time slices each bounded by a particular start and end time on a particular day of the week, usage statistics for the time slice based on jobs received on the interface during the time slice;
   selecting, by the imaging device, a power save entry timeout value and a power save exit timeout value for each time slice based on the usage statistics for the time slice;
   initiating, by the imaging device, a power saving sequence during each time slice based on the power save entry timeout value selected for the time slice;
   initiating, by the imaging device, a wakeup sequence during each time slice based on the power save exit timeout value selected for the time slice; and
   automatically combining, by the imaging device, at least two consecutive ones of the time slices into a larger time slice in response to determining that differences in the usage statistics compiled for the consecutive time slices are statistically insignificant, whereupon the larger time slice replaces the consecutive time slices in the plurality of discrete time slices for which power save entry timeout values and power save exit timeout values are selected.

14. The method of claim 13, wherein business holidays are excluded from the usage statistics.

15. The method of claim 13, wherein the usage statistics comprise an average number of jobs.

16. The method of claim 13, wherein the usage statistics comprise an average idle time between jobs.

17. The method of claim 13, wherein the jobs comprise imaging jobs and management jobs.

18. The method of claim 13, wherein the at least one interface comprises at least one of a network interface or a front panel interface.

* * * * *